(No Model.)
J. T. PEDERSEN.
SPACING INSTRUMENT.
No. 452,019.
2 Sheets—Sheet 1.
Patented May 12, 1891.
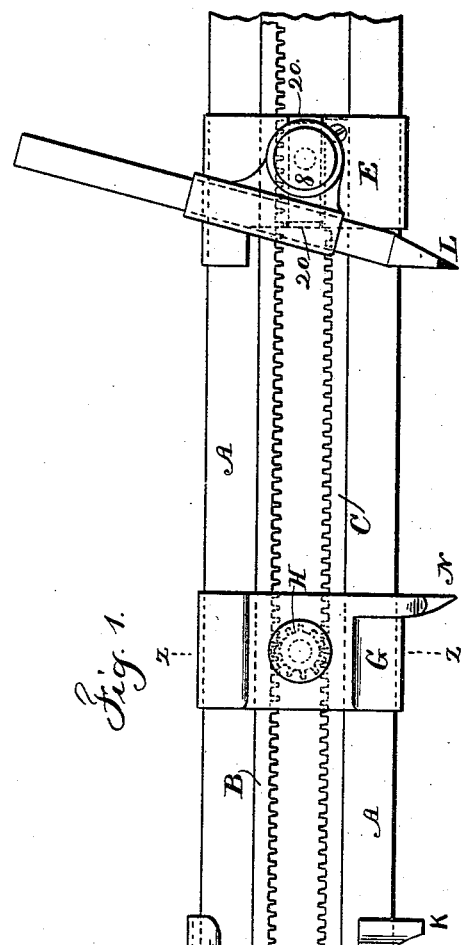
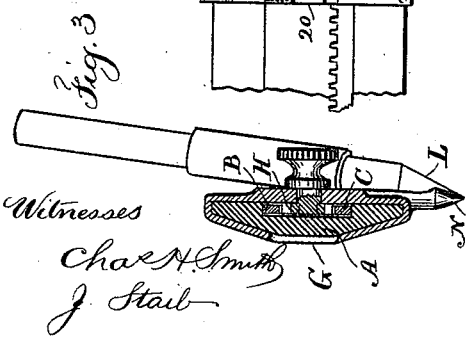
Witnesses
Chas. H. Smith
J. Stail
Inventor
Johannes T. Pedersen
per Lemuel W. Serrell
atty (No Model.) 2 Sheets—Sheet 2.
J. T. PEDERSEN.
SPACING INSTRUMENT.
No. 452,019. Patented May 12, 1891.
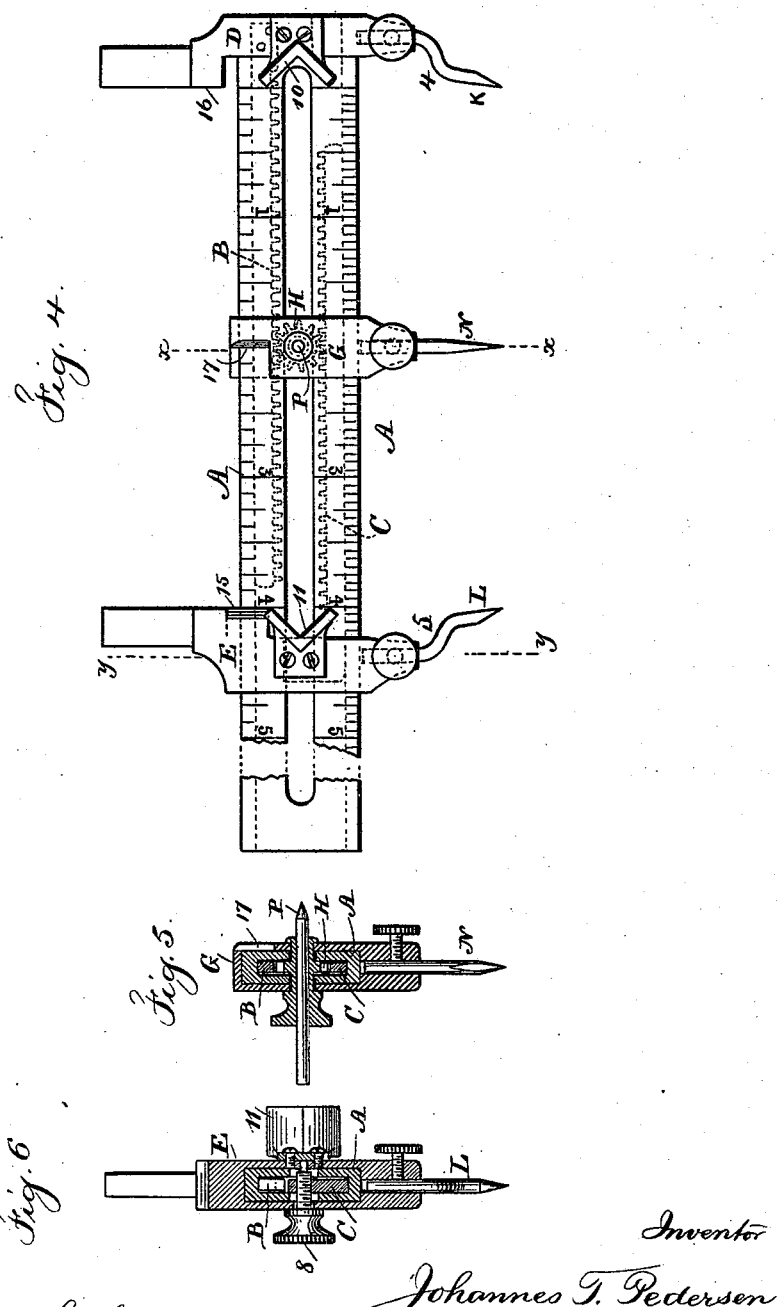

UNITED STATES PATENT OFFICE.

JOHANNES TH. PEDERSEN, OF NEW YORK, N. Y.

SPACING-INSTRUMENT.

SPECIFICATION forming part of Letters Patent No. 452,019, dated May 12, 1891.

Application filed September 17, 1890. Serial No. 365,244. (No model.)

*To all whom it may concern:*

Be it known that I, JOHANNES TH. PEDERSEN, a citizen of the United States, residing at the city, county, and State of New York, have invented an Improvement in Spacing-Instruments, of which the following is a specification.

Before my invention spacing-instruments had been made with three or more points capable of being moved nearer to or farther from each other and subdividing the intervening spaces equally, and such spacing-points had in some instances been acted upon by lazy-tongs, cross-bars, and in other instances by pinions of different sizes acting upon racks connected to the spacing-points. These instruments have been complicated and not well adapted to the circumstances under which such instruments are usually employed.

In my improvement I employ a rule or measure divided into inches or other standard lengths, and the spacing devices are fitted to slide upon such rule, and the holders for the spacing-points slide upon the rule in such a manner that the figures are easily discerned and the spacing-points set at any desired measurements.

This spacing-instrument is especially designed for machinists and for picture-frame makers and others where an external measurement is to be made and then an internal measurement and the difference between the two measurements divided up equally, so that with a picture-frame maker the external and internal measurements of the frame are easily determined according to the width of the frame, and the border around an engraving can easily be marked so as to leave an equal margin between the engraving and the frame, and with machinists the center of a shaft or other article can be determined without calculation and can be marked by either scratches or a center punch, thus greatly facilitating the work and lessening the risk of errors in equally dividing the measurements and the differences between one measurement and another.

In the drawings, Figure 1 is a rear view, and Fig. 2 a front view, of a rule or measure with my device applied thereto and a marker or pencil; and Fig. 3 is a cross-section at the line *z z*. These parts are well adapted to use with a yardstick or other measure. Fig. 4 is an elevation, and Figs. 5 and 6 are cross-sections at lines *x x* and *y y* of Fig. 4, respectively, of my spacing-instrument in the form adapted to the use of mechanics and machinists.

The rule A is of any desired length, and it is to be subdivided into feet and inches or other desired divisions, and such rule is recessed for the reception of the racks B and C. The rack B is connected to the slide D and the rack C is connected to the slide E, and these slides D and E pass over both edges of the rule, and they are of sufficient length to steady the slides in their movements backward and forward upon the rule.

G is a central slide or head carrying the pinion H, which is between and gears into the teeth of the respective racks B and C, and upon the slide D is a point K, upon the slide E a point L, and upon the slide G a point N, and these points are to be adapted to the particular use for which the instrument is intended.

In Figs. 1 and 2 the point L for the slide E is represented as a pencil within a socket upon the slide E, and the point K is represented as upon an arm 3, extending out from the slide D, while in Figs. 4 and 5 the points L and K are represented as wires bent at 4 and 5, so that such points can be brought close up to the central point N, and these points should be made of steel and suitably hardened, so as to be adapted to scratching or otherwise marking upon metallic articles.

When the instrument is made in the form shown in Figs. 3 and 4, it is preferable to groove the inner opposite faces of the slot that runs longitudinally of the instrument, so as to receive the racks B and C into such grooves. In the form shown in Figs. 1 and 2 the back of the rule is recessed for the reception of the racks, and all three of the slides D, E, and G are movable lengthwise upon the rule, and the racks D and E are provided with clamping-screws 7 and 8. By loosening these clamping-screws all three of the racks D, E, and G are free to be slid lengthwise upon the rule A, and the racks B and C move along with the slides. Hence either one of the points K, L, or N can be moved to any measure desired upon the rule.

The use of this instrument may be illustrated as follows: A picture-frame maker may move all three slides until the pointers arrive at the division denoting the external size of the picture-frame. The slide E may then be clamped, and the slides D and G move along until the point N shows the width of the frame, and at that same time the point K will indicate the measurement of the opening in the picture-frame. The rule may be used in a similar manner in marking an engraving for cutting the border. The three slides will in that case be moved along until the points come to the measure of the internal opening of the picture-frame. The slide E is then to be clamped and the two slides D and G moved until the point K corresponds to the measurement of the engraving, and the point N, being midway between K and L, will bisect the space left for the two margins and indicate the margin at each side of the engraving, and in consequence of the slide E being provided with the pencil-point L the same may be used to mark upon the paper.

The instrument represented in Figs. 3 and 4 may be used in the same manner as before mentioned in bisecting any distance in machine-work with accuracy, and it will be apparent that the tool is easily and cheaply made and inaccuracy resulting from wear is reduced to a minimum.

As an additional convenience for machinists, the arbor of the pinion H is made tubular for the reception of the center punch P, and upon the slides D and E, respectively, there are V-shaped flanges 10 and 11, which preferably project from the respective slides in such a way as to pass freely over the center slide G and come up more or less closely around the point of the center punch P, and it will now be apparent that when the parts are moved so as to bring the slides D and E toward each other these V-shaped flanges can be brought up against opposite sides of a circular shaft or other article and the center punch P will be accurately in the middle at the end of such circular article, and such rod, shaft, or other article can be marked by a blow upon the center punch without injury to the instrument, as such center punch slides freely through the tubular arbor of the pinion H. There may be a screw or other device passing into a recess in the center punch to prevent such center punch falling out, or the center punch may be removable, so as to be out of the way of the other parts of the instrument.

The clamping device for the slides may be of any suitable character. In Figs. 1 and 2 there are keys 20 between the slides and the bottom of the groove containing the toothed racks, against which keys the clamping-screws 7 and 8 act, and in Figs. 4 and 5 the clamping-screw 8 passes through a nut formed at the end of the rack C, so that the screw clamps the nut portion firmly within the longitudinal groove of the measuring-rule. In this form of instrument the head or slide D may be a fixture at the end of the measuring-rule. The portion or edge 15 of the slide E is adjacent to the divisions on the measuring-rule, and it is in line with the point L. The portion or edge 16 on the slide D is in line with the point K, and the portion or edge 17 on the slide G is central and in line with the point N. Hence these portions or measuring-edges 15, 16, and 17 enable the artisan to measure accurately the distances between the respective points, even though such points project at some distance from the divisions of the measuring-rule.

I claim as my invention—

1. The combination, with a measuring-rule, of three slides or heads D, E, and G, points connected with the respective slides, racks connected with the outer slides and received into recesses in the measuring-rule, and a pinion connected with the central slide and acting between the racks and in opposite directions upon the same, substantially as set forth.

2. The combination, with the measuring-rule, slotted or recessed longitudinally, of three slides loose upon the measuring-rule and adapted to be moved endwise of the same, racks connected with the outer slides and extending in opposite directions, a pinion between the two racks and connected with the central slide, and clamping devices for holding the slides in position after adjustment, substantially as set forth.

3. The combination, with a measuring-rule recessed or slotted longitudinally, of three slides or heads, toothed racks connected with the end slides or heads and extending in opposite directions within the recess of the measuring-rule, a pinion connected with the central slide, and points projecting from the respective slides and in line with the respective measuring-edges, substantially as set forth.

4. The combination, with a measuring-rule, of racks extending in opposite directions, heads or slides connected with such racks, a central pinion between the racks, a tubular arbor for the pinion, and a central punch passing through the central arbor, substantially as set forth.

5. The combination, with a measuring-rule, of three slides, toothed racks connected with the outer slides and extending in opposite directions, a pinion between the racks and having a tubular arbor passing through the central slide, a center punch in the said tubular arbor, and V-flanges upon the outer slides or heads, substantially as set forth.

6. The combination, with a measuring-rule, of three slides loose upon the measuring-rule and adapted to be moved endwise of the same, racks connected with the outer slides and extending in opposite directions, a pinion between the two racks and connected with the central slide, and a clamping device for holding one of the slides in position after adjustment, substantially as set forth.

Signed by me this 13th day of September, A. D. 1890.

JOHANNES TH. PEDERSEN.

Witnesses:
HAROLD SERRELL,
WILLIAM G. MOTT.